United States Patent [19]

Gauer

[11] Patent Number: 4,738,329
[45] Date of Patent: Apr. 19, 1988

[54] DOOR POSITIONER

[75] Inventor: Larry C. Gauer, Dubuque, Iowa

[73] Assignee: Deere & Company, Moline, Ill.

[21] Appl. No.: 878,731

[22] Filed: Jun. 26, 1986

[51] Int. Cl.⁴ .................................................. B60J 5/04
[52] U.S. Cl. ................................... 180/89.12; 16/294; 49/386; 180/136; 296/146
[58] Field of Search ............................ 180/136, 89.12; 296/146; 49/386; 16/291, 294

[56] References Cited

U.S. PATENT DOCUMENTS

| 2,189,818 | 2/1940 | Murrin | 16/291 |
| 3,967,850 | 7/1976 | Whisler | 296/146 |

FOREIGN PATENT DOCUMENTS

| 3528299 | 3/1987 | Fed. Rep. of Germany | 296/146 |
| 81/02179 | 8/1981 | PCT Int'l Appl. | 296/146 |

Primary Examiner—Richard A. Bertsch
Assistant Examiner—Mitchell J. Hill

[57] ABSTRACT

An operator's station mounted on the rear bogie of an articulated tractor and having a door that swings out from a hinge on its rear edge and in which the front bogie may swing relative to the rear bogie so that parts of the tractor on the front bogie may move into the zone of swinging of the door, the improvement residing in the hinge structure and door positioning structure which automatically shifts the door into either its fully opened or fully closed positions and out of the area in which the aforesaid tractor parts may shift. The structure includes means for hinging the door to swing about a vertical axis from its rear edge and a link structure that is connected to a post on the operator's station and which has a rear end connected thereto on a pivot structure that is offset inwardly and rearwardly from the hinge axis of the door. The link structure further includes a portion that extends from its rear and forwardly alongside a face of the door to a front end which is connected to the door. The link structure also includes a spring under tension which creates a biasing force on the door to swing the door to its fully opened and closed positions as the link structure passes to opposite sides of the hinge axis of the door.

5 Claims, 3 Drawing Sheets

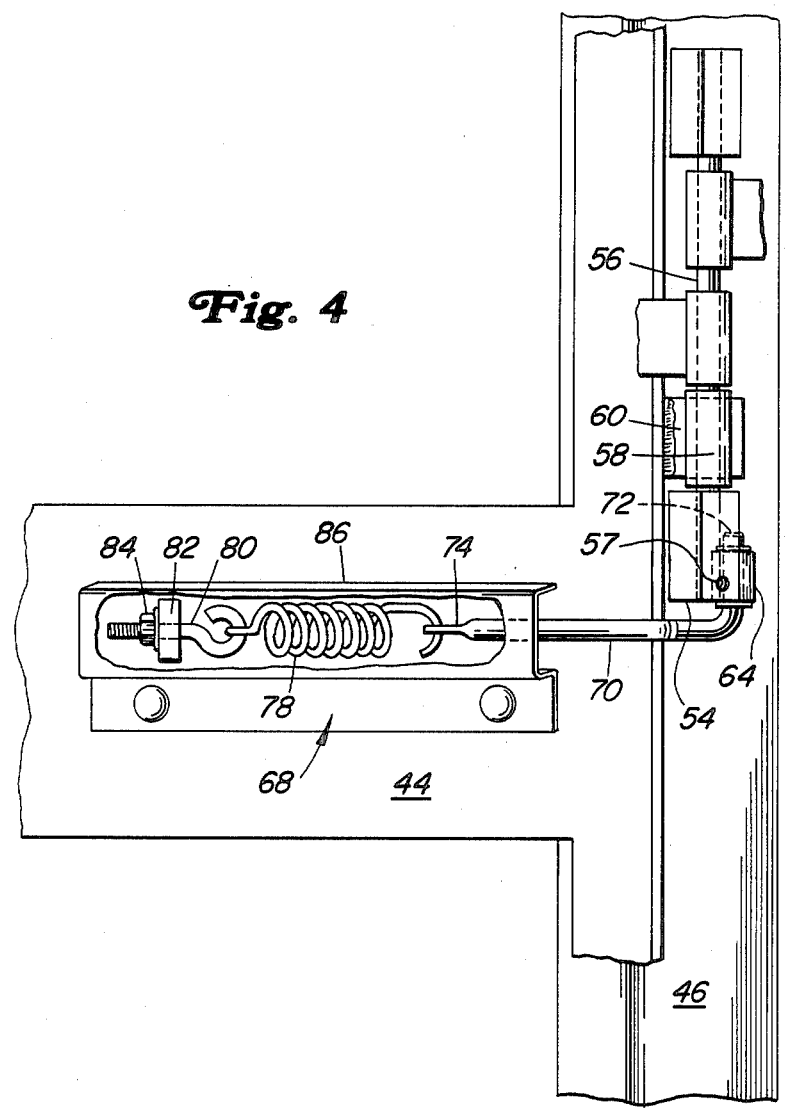

DOOR POSITIONER

BACKGROUND OF THE INVENTION

On articulated tractors, there is provided an operator's station or compartment on one of the bogies with a side door permitting egress from and ingress into the compartment. Often, this door will be left slightly opened and as the front bogie swings toward the rear bogie when the tractor is turning, portions or parts on the front bogie will strike the door, either damaging it or destroying it in its entirety. Damage to the door will, of course, prevent it from closing properly. This could create problems with respect to the heating, air conditioning, or sound system within the operator's station. Striking of the door by the tractor parts can destroy the glass window which is normally heat-treated and rather expensive to replace. Therefore, while carelessness by the operator may be the cause of damage to the door, there nevertheless often occurs a situation where the door is left only partially opened and damage occurs to the door.

SUMMARY OF THE INVENTION

With the above in mind, it is proposed to provide a hinge structure between the rear portion of the door and a post that is part of the operator's compartment which causes the door to swing from a fully opened to a fully closed position.

A retractible and extendable link structure is provided and has one of its ends connected to a vertical pivot on the operator's station that is offset inwardly and rearwardly from the hinge axis of the door. The link structure extends from that end alongside a face of the door and has its opposite end connected to the door. The hinge is positioned vertically with respect to the link structure so that the entire link structure may swing through an extension of the hinge axis and to opposite sides of the axis. A part of the link structure includes a pre-stretched spring which biases the door to move on its hinge axis to its fully opened and fully closed positions.

BRIEF DESCRIPTION OF THE DRAWINGS

FIG. 4 is a side view of the door structure shown in FIG. 3 and taken substantially along the line 4—4 of FIG. 3.

DESCRIPTION OF THE PREFERRED EMBODIMENT

Figure 1:
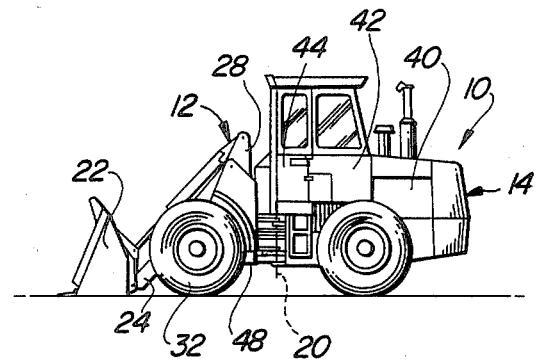
FIG. 1 is a side view of an articulated tractor having the door structure that is the subject matter of the present invention.
Figure 2:
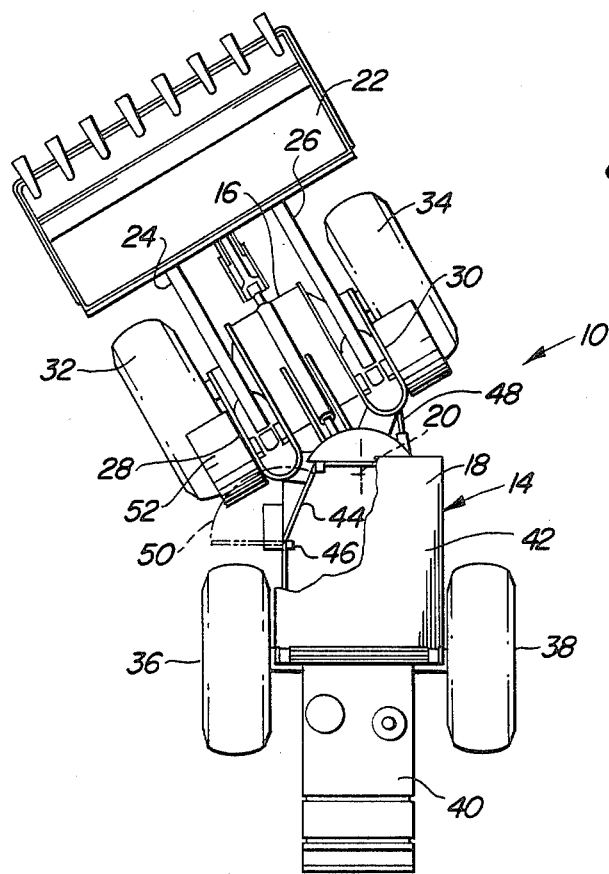
FIG. 2 is a plan view, somwhat larger than the side view shown in FIG. 1, showing the tractor in a turning position.

In an articulated tractor 10, having a front bogie 12 and a rear bogie 14, the front bogie 12 has a front frame 16 that is connected at its rear end to a rear frame 18 so that the two frames 16 and 18 swing relative to one another about a vertical axis, the location of which is indicated at 20. The front bogie 12 includes a loader 22 having lift arms 24, 26 pivotally mounted on posts 28, 30. The front frame 16 is supported on left- and right-hand wheels 32, 34. The rear bogie 14 is carried on left- and right-hand support whels 36, 38 and has at its rear end the power unit or engine, indicated in its location by the engine cowling 40. Just forward of the engine 40 is an operator's compartment 42 that includes a side door 44 that is hinged at its rear edge on a vertical post 46 so that it can swing between a fully opened position and a fully closed position, as shown in FIG. 2. The compartment 42 further includes the operating controls for the entire tractor with a seat, steering wheel and loader controls carried within the compartment.

The front frame 16 is swung about its pivot axis 20 by power means that includes hydraulic cylinders such as are shown at 48. Referring to FIG. 2, the path of the forward free edge of the door is shown by the circular representation at 50. It will further be noted that as the cylinder 48 on the right side of the respective frames 16, 18 is extended, the left post 28 and a wheel fender 52 will swing into the zone or arc 50 of the door 44. Therefore, if the door 44 were left in a position of being only partially opened, the fender 52 or post 28 would contact the free edge and crush the door. It should also be noted that no interference between the door 44 and the fender or other parts of the front tractor bogie occurs when the door 44 is in it fully opened or fully closed position. It is the purpose of the present invention to provide structure, presently to be described, which will automatically move the door 44 to its fully closed position or its fully opened position, but will not retain it in any intermediate position between these limits.

Figure 3:
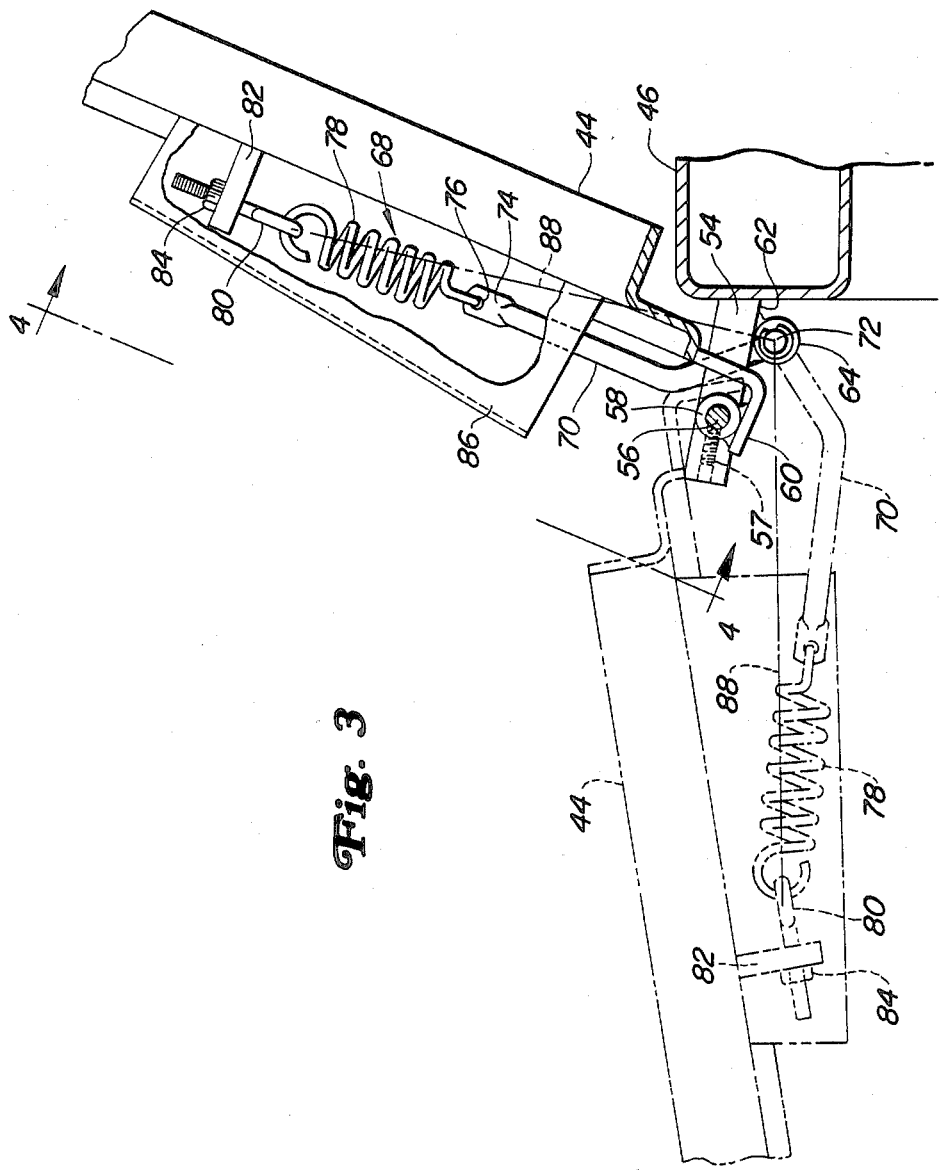
FIG. 3 is an enlarged plan view, partially broken away, showing the hinge structure for the door and the structure that positions the door in its fully opened or fully closed positions.

Referring now to FIGS. 3–4, there is provided on the outboard side of the upright post 46 bracket supports, one of which is shown at 54. The bracket support 54 is welded to the outer surface of the post 46 and carries adjacent its outermost end a hinge pin or rod 56. The hinge pin 56 is fixed against axial shifting by a set screw 57. While FIGS. 3 and 4 show only one hinge suport, it should be understood that there is a second or upper hinge support identical to that of 54 which carries the upper end of the hinge pin 56. Mounted on the hinge pin is a hinged journal 58 which has welded to its outer surface and "L" shaped hinge bracket 60 that has one leg projecting fowardly and welded to the rear edge of door 44. Again, it should be understood that a similar hinged journal 58 and bracket 60 is provided adjacent an upper hinge support 54 and stabilizes the door on the respective hinge brackets 60 and their respective journals 58. Thus, the door 44 may swing between its fully opened and fully closed positions on the hinge pin 56 and about the upright axis of the pin.

Mounted on the rear vertical face 62 of the hinge support 54 is a link support 64 that has an opening forming a vertical pivot therein. A link structure, indicated in its entirety by the reference numeral 68, extends from the pivot opening forwardly along the outer face of the door 44. The link structure 68 includes an "L" shaped rod 70 that has a vertical leg 72 extending through a pivot opening of the link support 64. In viewing FIGS. 3 and 4, it will be noted that the axis of the pivot opening of the support 64 and the leg 72 is rearwardly and inwardly with respect to the axis of the hinge pin 56. A pair of locking rings is positioned on the tractor provided above and below the bracket 64 for purposes of holding the vertical leg portion 72 in the bracket support 64. The link 70 is therefore capable of swinging about the vertical axis of the pivot opening. The hinge pin 56 terminates above the link structure 68 and particularly the link member 70. The forward end of the link member 70 is flattened at 74 and has an opening 76 therein for receiving the rear end of a pre-stretched spring 78, the forward end of which extends through an eyelit bolt 80. The eyelit bolt has its threaded free end extending through a bracket 82 welded to the outer surface of door 44. A nut 84 is provided for adjusting the tension in the spring 78. A U-shaped cover 86 is provided on the outer surface of the door 44 and covers the spring 78, the forward end of rod 70, and the rear connection between the spring 78 and the bracket.

Reviewing FIGS. 3 and 4 for understanding the operation of the door and its mounting structure, it will be noted that the force of the spring 78 is directed along the axis of the entire linkage 68 and through the axis of the vertical leg portion 72. The line of force, as indicated in FIG. 3 at 88, will swing with the door 44. Thus, as an operator would open the door 44 from the position shown in full in FIG. 3, the line of force 88 will move in a clockwise direction and always through the axis of the pin portion 72 and its opening. The spring 78, being in a pre-stretched position, will resist outward movement of the door 44 and should the door 44 be released, the spring would cause the door to move back to its fully closed position. However, as the door swings to the opposite side of the axis of the rod 56, the line of force will pass to the left or to an overcenter position and the force 88 will thereafter cause the door to swing toward a fully opened position and to be retained in that opened position. Thus, for release of the door in any position between its fully opened and fully closed position, the door structure will automatically shift either to the fully opened or fully closed position, depending at where the door is released.

I claim:

1. In combination, an articulated tractor having a wheel supported front frame vertically pivotally connected at its rear end to the forward end of a wheel supported rear frame; and operator's station on the rear frame including an operator's enclosure; a vertical post on the rear frame defining the rear upright edge of an opening to the enclosure permitting ingress and egress; a side for vertically hingably mounted at its rear edge on the vertical post to swing in a swinging zone about an upright axis between a fully closed and fully opened position; power means between the frames for shifting the forward frame relative to the rear frame and to move parts of the tractor on the front frame into and out of said swinging zone; structure defining a vertical pivot supported on the rear frame and offset transversely and fore-and-aft with respect to the aforesaid upright axis; and link structure having a rear end pivotally mounted on the structure defining the vertical pivot and projecting from said rear end alongside a face of the door to a forward end connected to said door, said link structure having therein a pre-loaded spring effecting a biasing force on said door to move the latter to its fully opened and closed positions as the link structure is shifted respectively to opposite sides of said upright axis and to move the door out of the aforesaid swinging zone to thereby avoid contact between the door and said tractor parts on the front frame when said parts are shifted by said power means into said swinging zone.

2. The invention defined in claim 1 in which said vertical pivot is positioned inwardly and rearwardly of said upright axis, and said door is vertically hingably mounted on the post by hinge means vertically offset from the link structure and said structure defining the vertical pivot.

3. The invention defined in claim 2 in which the link structure extends from the aforesaid vertical pivot along the outer face of said door and a cover is mounted on the door for shielding a major portion of said link structure.

4. The invention defined in claim 3 in which said link structure is composed of an elongated and fore-and-aft extending link having its rear end mounted to swing on the vertical pivot and having its forward end connected to the rear end of a pre-stretched spring, the latter of which has its forward end anchored to said door.

5. In combination, an articulated tractor having a wheel supported front frame vertically pivotally connected at its rear end to the forward end of the wheel supported rear frame; and operator's station on one of said frames including an operator enclosure including a vertical post defining one edge of an opening permitting ingress and egress; a side door thereon vertically hingably mounted on the vertical post to swing in a swinging zone about an upright axis between fully closed and fully opened positions; and power means between the frame for shifting the one frame relative to the other frame and to move tractor parts on one of the frames into and out of the swinging zone of the door, vertical pivot structure on the operator's station transversely and fore-and-aft offset with respect to said upright axis; and extendable and retractable link structure having one end pivotally mounted on the vertical pivot structure and projecting from said end alongside a face of the door to its other end connected to said door, said link structure having therein a prestretched spring effecting a biasing force on said door to move the door to its fully opened and closed positions as the link structure is shifted respectively to opposite sides of said upright axis and to move the door out of the aforesaid swinging zone to thereby avoid contact between the door and said tractor parts when said parts are shifted by said power means into said swinging zone.

* * * * *